US010271632B2

(12) United States Patent
Anerino

(10) Patent No.: US 10,271,632 B2
(45) Date of Patent: *Apr. 30, 2019

(54) HEATABLE CANTEEN

(71) Applicant: Daniel J. Anerino, Athens, OH (US)

(72) Inventor: Daniel J. Anerino, Athens, OH (US)

(*) Notice: Subject to any disclaimer, the term of this patent is extended or adjusted under 35 U.S.C. 154(b) by 387 days.

This patent is subject to a terminal disclaimer.

(21) Appl. No.: 14/991,934

(22) Filed: Jan. 9, 2016

(65) Prior Publication Data

US 2017/0196395 A1   Jul. 13, 2017

(51) Int. Cl.
A47J 27/21    (2006.01)
A45F 3/18     (2006.01)
F16K 17/04    (2006.01)
F16K 15/06    (2006.01)

(52) U.S. Cl.
CPC .............. A45F 3/18 (2013.01); F16K 15/063 (2013.01); F16K 17/0406 (2013.01)

(58) Field of Classification Search
CPC ............................... F16K 17/0406; A45F 3/18
USPC ................. 215/260, 274; 220/573.1, 203.23, 220/203.27, 203.29, 8
See application file for complete search history.

(56) References Cited

U.S. PATENT DOCUMENTS

| 4,160,462 | A | * | 7/1979 | Rossi-Ashton | A47J 27/09 137/529 |
| 4,450,966 | A | * | 5/1984 | Villavicencio, Jr. | C02F 1/002 138/119 |
| 4,733,795 | A | * | 3/1988 | Boehm | A47J 27/08 220/316 |
| 5,203,465 | A | * | 4/1993 | Baumgarten | A47J 27/212 220/203.05 |
| 5,211,300 | A | * | 5/1993 | Hsing | A61J 9/00 215/11.4 |
| 5,427,271 | A | * | 6/1995 | Wang | A47G 19/2272 220/255 |
| 6,290,090 | B1 | * | 9/2001 | Essebaggers | B65D 47/248 220/705 |
| 6,648,162 | B1 | * | 11/2003 | Wooderson | A47J 27/0813 220/203.27 |
| 7,143,783 | B2 | * | 12/2006 | Emke | F16K 17/196 137/512.1 |
| 7,934,537 | B2 | * | 5/2011 | Kolowich | A47G 19/127 165/10 |
| 2004/0011800 | A1 | * | 1/2004 | Essebaggers | A47G 19/2272 220/714 |
| 2008/0290090 | A1 | * | 11/2008 | Kindler | A47J 27/0802 220/203.05 |

(Continued)

Primary Examiner — Anthony Stashick
Assistant Examiner — Onekki Jolly
(74) Attorney, Agent, or Firm — R. William Graham

(57) ABSTRACT

A hand held heatable vessel has a bottom and upward extending wall which terminates into a top having an open top receiving surface, a removable cap connects to the top receiving surface, the removable cap has an outer portion which removably sealably connects to the top receiving surface and has an interior channel extending therethrough and has a valve seat in a lower end thereof, a valve stem with a valve head seal is operably disposed in the interior channel and a spring is operably disposed about the valve stem in a manner to bias the valve head seal against the valve seat to a normally closed position. A secondary vessel is provided about the hand held heatable vessel.

8 Claims, 2 Drawing Sheets

(56) References Cited

U.S. PATENT DOCUMENTS

| | | | | |
|---|---|---|---|---|
| 2009/0218309 A1* | 9/2009 | Wang Wu | ............ | B65D 47/244 |
| | | | | 215/388 |
| 2010/0025401 A1* | 2/2010 | Jagemann | ................ | F16K 17/04 |
| | | | | 220/203.29 |
| 2010/0308047 A1* | 12/2010 | Regan | ........................ | A45F 3/18 |
| | | | | 220/212.5 |
| 2011/0084076 A1* | 4/2011 | Whelan | .............. | F02M 37/0076 |
| | | | | 220/367.1 |
| 2011/0290806 A1* | 12/2011 | Heidrich | ................. | A47J 27/09 |
| | | | | 220/582 |
| 2012/0138161 A1* | 6/2012 | Wolthers | .............. | B67D 1/0431 |
| | | | | 137/15.12 |
| 2012/0255951 A1* | 10/2012 | Grozinger | ............... | A47J 27/08 |
| | | | | 220/203.07 |

* cited by examiner

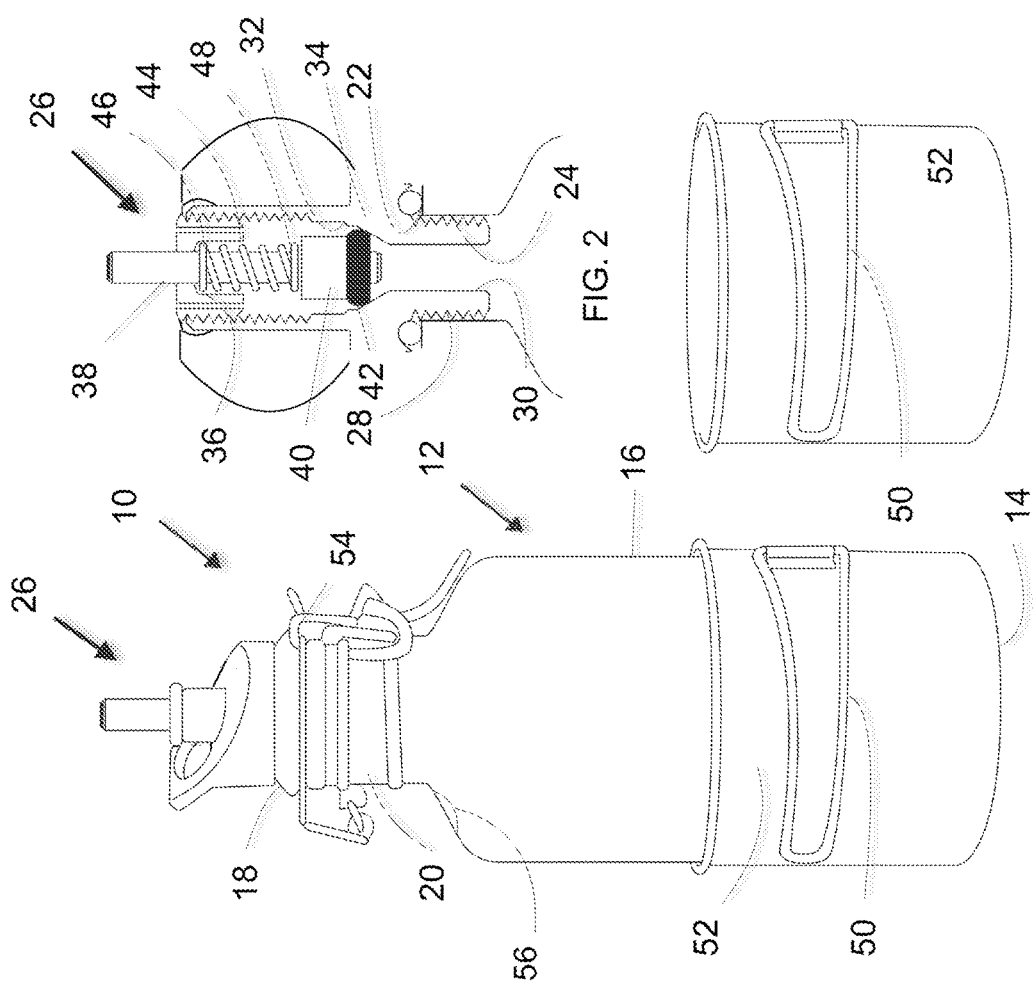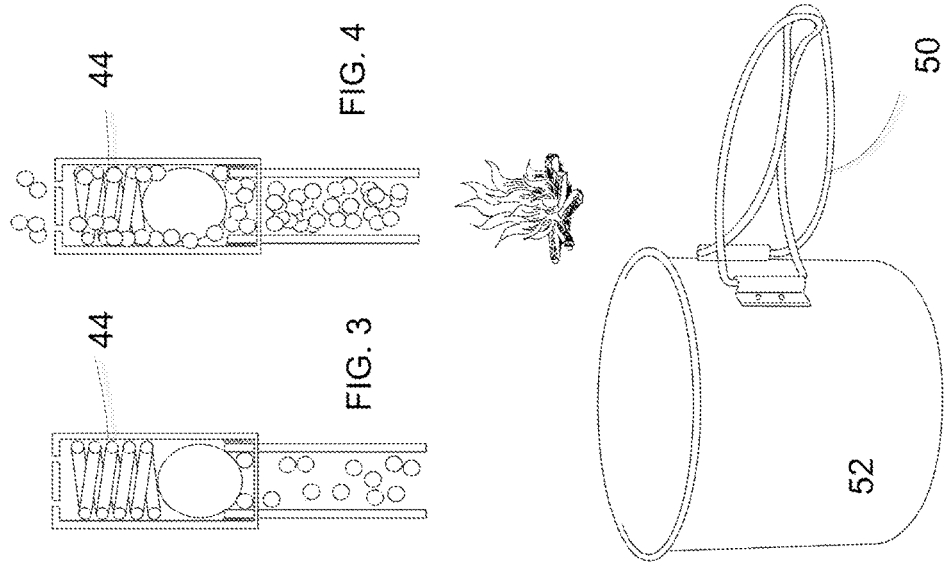

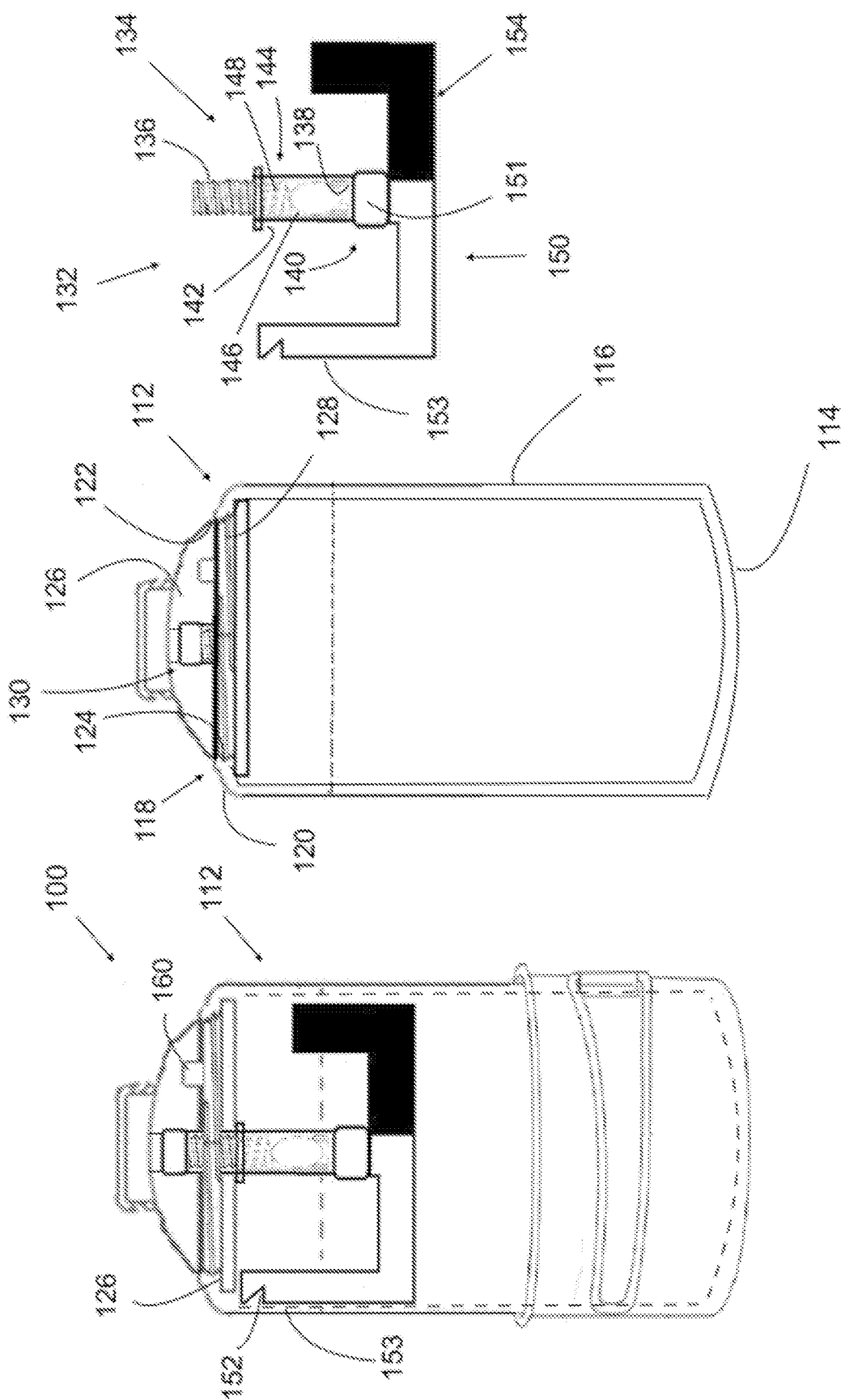

HEATABLE CANTEEN

BACKGROUND OF INVENTION

Field of Invention

The instant invention relates to heatable containers. More particularly, the invention relates to a heatable canteen.

Prior Art

The prior art has numerous devices for heating vessels. For example, tea kettles have been used to heat liquid therein and commonly includes a hinged lid which covers a port on the top of the kettle. When the fluid, such as water, reaches a sufficient temperature, the lid opens to let steam out indicating the fluid therein has reached a desired temperature.

Canteens are well known to be fashioned in a vessel of a generally hand held size with a port to which a top fixes, such as a threaded top, to maintain the fluid therein in a manner to prevent leakage during transportation or evaporation. While there are many known canteen types and configurations, there remains a need to improve canteens to have multifunction characteristics.

SUMMARY OF INVENTION

It is an object to improve heatable vessels.

It is a further object to improve canteens.

Still another object is to provide a heatable canteen.

Accordingly, an embodiment of the invention is directed to a heatable canteen. The heatable canteen preferably includes a hand held vessel having a bottom and upward extending wall which terminates into a top having an open top receiving surface, such as a port. A removable cap is connected to the top receiving surface. The cap includes an outer portion which removably sealably connects to the top receiving surface and has an interior channel extending therethrough and has a valve seat formed on a lower end thereof. A valve stem with a valve head seal is operably disposed in the interior channel and a spring is operably disposed about the valve stem in a manner to bias the valve head seal against the valve seat to a normally closed position. In this way when the cap is disposed onto the vessel, the fluids are normally contained therein regardless of orientation of the canteen. The spring is of a spring constant such that upon the canteen being heated, for example over a fire, upon sufficient heat being applied the pressure builds to cause the spring to compress relieving the pressure and alerting the user that the fluids are sufficiently heated. In addition, there is provided a pair or arms, preferably removable and pivotal, connected to the canteen providing a handle which may be grasped by the user to place the canteen over a fire. The arms can be connected to a secondary vessel which removably friction fits about the hand held vessel and can be used to hold the same over a fire or can be removed and used as a cooking vessel.

Further objects will be apparent from reading the disclosure and drawings hereto.

BRIEF DESCRIPTION OF THE DRAWINGS

FIG. 1 is a perspective view of an embodiment of the invention.

FIG. 2 is a partial sectional view of a cap of the invention.

FIG. 3 is a functional representation of the cap in a closed position.

FIG. 4 is a function representation of the cap in an open position.

FIG. 5 is a secondary vessel with arms closed.

FIG. 6 is a secondary vessel with arms open.

FIG. 7 is sectional schematic of another embodiment of the invention.

FIG. 8 is a sectional schematic of FIG. 7 with a pressure receive valve removed.

FIG. 9 depicts a pressure relief valve seen in FIG. 7.

DETAILED DESCRIPTION OF PREFERRED EMBODIMENT

Referring now to the drawings, a heatable canteen of the instant invention is generally designated with the numeral 10. The heatable canteen 10 preferably includes a hand held vessel 12 which here is seen as generally cylindrical, however, other geometric configurations are contemplated. The hand held vessel 12 has a bottom 14 and upward extending wall 16 which terminates into a top 18 by way of a neck 20. The top 18 has an open top receiving surface 22, such as a port, which communicates with an inner surface 24 of neck 20.

A removable cap 26 is connected to the top receiving surface 22. The cap 26 includes an outer portion 28 which removably sealably connects to the top receiving surface 22 and has an interior channel 30 extending therethrough and has a valve seat 32 formed on a lower end 34 thereof. An upper ledge 36 is formed in the interior channel 30. One type of valve assembly includes a valve stem 38 having a valve head seal 40 is operably disposed in the interior channel 30. The valve head seal 40 can include a gasket 42. A spring 44 is operably disposed about the valve stem 38 one end 46 against upper ledge 36 and another end 48 against valve head seal 40 in a manner such that it biases the valve head seal 40 and gasket 42 against the valve seat 32 to a normally closed position. In this way when the cap 26 is disposed onto the hand held vessel 12, the fluids are normally contained therein regardless of orientation of the canteen 10. This permits the user to carry the canteen 10 in a backpack or like or on a belt without risk of leakage. The spring 44 is of a spring constant such that upon the canteen 12 being heated, for example over a fire, upon sufficient heat being applied the pressure builds to cause the spring 44 to compress relieving the pressure and alerting the user that the fluids are sufficiently heated.

In addition, there is provided a pair or arms 50, preferably removable and pivotal, and as envisioned can be connected to the canteen 12 directly or indirectly providing a handle which may be grasped by the user to place the canteen 12 over a fire. In the case of indirect connection, the arms 50 can be connected to a secondary vessel 52 which removably friction fits about the hand held vessel 12 and can be used to hold the same over a fire or can be removed and used as a separate cooking vessel.

FIG. 3 depicts a closed position. FIG. 4 depicts an open position when the canteen 10 is under heat. The cap 26 can be hingedly connected to the neck 20 by way of a hinge lock mechanism 54 of the type known in the art.

Additionally, a safety relief valve 56 can also be incorporated into the hand held vessel 12. In this way, if the other valve assembly fails to open under dangerous temperature and pressure, the safety valve 56 will open if a predetermined temperature/pressure condition exists which is predetermined a dangerous level.

As seen in FIGS. 7, 8 and 9, an alternative embodiment of the invention is provided. Here, a canteen 100 includes a hand held vessel 112 which here is seen as generally cylindrical, however, other geometric configurations are contemplated. The hand held vessel 112 has a bottom 114 and upward extending wall 116 which terminates into a top 118 by way of a neck 120. The top 118 has an open top receiving surface 122, such as a port, which communicates with an inner surface 124 of neck 120.

A removable cap 126 is connected to the top receiving surface 122. The cap 126 includes an outer portion 128 which removably sealably connects to the top receiving surface 122, such as a threaded surface, and has an interior channel 130 extending therethrough which can also be threaded. In this embodiment, there is provided a J shaped pressure relief valve 132 having a stem 134 having a threaded end 136 for threadbare connecting to threaded channel 130. Inside the stem 134 can be a valve seat 138 formed in a lower end 140 thereof. An upper ledge 142 is formed in a midsection 144 thereof. A valve assembly lies within the stem 134 includes a valve head seal 146 operably disposed therein. A spring 148 or other biasing mechanism can be operably disposed against upper ledge 142 and another end against valve head seal 146 in a manner to provide a normally closed position. In this way, the fluids are normally contained therein regardless of orientation of the canteen 100. This permits the user to carry the canteen 100 in a backpack or like or on a belt without risk of leakage.

Another portion of J shaped pressure relief valve 132 is angled conduit 150 which has one end 151 rotatably connected to the lower end 140 of the stem 134 and another end 153 terminating adjacent the cap 126 and has an orifice 152 which faces inside wall 116 adjacent the cap 126. In opposite relation to conduit 150 is a weight 154 fixable attached to end 151 such that when the canteen is turned on its side, the end 153 remains up in order to aid in venting to outside atmosphere through the pressure relief valve 132. The pressure relieve valve 132 works in a like manner as described above. Additionally, a safety valve 160 can be incorporated into the canteen 100. The canteen 10, 100 and its components can be made of high heat resistant material, such as stainless steel for all parts which are exposed high heat.

While the instant invention has been described in and shown above, there are various modifications, derivations and improvements which can be employed. Accordingly, these modifications, derivations and improvements are to be covered by the appended claims.

What is claimed is:

1. A heatable canteen, which includes:
   a hand held vessel made of a high heat resistant material for disposal in a boiling hot environment having a bottom and an upward extending wall which terminates into a top having an open top receiving surface;
   a removable cap made of a high heat resistant material for disposal in a boiling hot environment connected to said top receiving surface, said removable cap having an outer portion which removably sealably connects to said top receiving surface and has an interior channel extending therethrough having a first upper end communicating outside said vessel and a second lower end which communicates inside said vessel and terminates adjacent said top and has a pressure relief valve therein to provide a normally closed position through a biasing mechanism connected thereto and which under a predetermined amount of one of pressure and temperature moves to an open position; and
   a J-shaped conduit having a first upper end sealably connected to said interior channel and a second lower end rotatably connected to said first upper end to a rotatable connection and having a terminal orifice adjacent said removable cap and inside and adjacent said upward extending wall and further including a weighted member heavier than said second lower end and fixably connected to said rotatable connection and extending generally opposite said second lower end such that rotational movement of said weighted member causes rotational movement of said second lower end and displacement of said terminal orifice within said vessel.

2. The heatable canteen of claim 1, which further includes at least one arm connected to said canteen providing a handle which may be grasped by a user to place said canteen over a fire.

3. The heatable canteen of claim 2, wherein said arm is removable.

4. The heatable canteen of claim 2, wherein said arm is pivotal.

5. The heatable canteen of claim 1, wherein said biasing mechanism includes a valve stem with a valve head seal operably disposed in said interior channel and a spring is operably disposed about said valve stem in a manner to bias said valve head seal against a valve seat to said normally closed position.

6. The heatable canteen of claim 5, wherein said spring is of a spring constant such that upon said canteen being filled with fluid heated and upon sufficient heat being applied pressure builds to cause said spring to compress relieving pressure through an opening formed between said valve head seal and said valve head seat.

7. The heatable canteen of claim 1, which includes a secondary vessel which removably friction fits about said hand held vessel and having an arm connected thereto to hold said secondary vessel over a fire.

8. The heatable canteen of claim 1, which further includes a safety valve mechanism formed in said canteen which opens upon a predetermined temperature/pressure condition being reached.

* * * * *